US010509816B2

(12) United States Patent
Hong et al.

(10) Patent No.: US 10,509,816 B2
(45) Date of Patent: Dec. 17, 2019

(54) RUNTIME EXPANSION OF TARGETING CRITERIA BASED ON USER CHARACTERISTICS

(71) Applicant: Facebook, Inc., Menlo Park, CA (US)

(72) Inventors: Sue Ann Hong, San Francisco, CA (US); Gang Wu, Sunnyvale, CA (US); Rituraj Kirti, Los Altos, CA (US); Vladislav Isenbaev, Union City, CA (US); Boris Pierre Arnoux, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 391 days.

(21) Appl. No.: 14/290,355

(22) Filed: May 29, 2014

(65) Prior Publication Data

US 2015/0332336 A1 Nov. 19, 2015

Related U.S. Application Data

(60) Provisional application No. 61/994,443, filed on May 16, 2014.

(51) Int. Cl.
| | | |
|---|---|---|
| *G06Q 30/02* | (2012.01) | |
| *G06Q 50/00* | (2012.01) | |
| *G06F 17/30* | (2006.01) | |
| *G06F 16/435* | (2019.01) | |
| *G06F 16/28* | (2019.01) | |
| *G06F 16/2457* | (2019.01) | |

(52) U.S. Cl.
CPC ...... *G06F 16/437* (2019.01); *G06F 16/24578* (2019.01); *G06F 16/285* (2019.01); *G06Q 30/0269* (2013.01); *G06Q 50/01* (2013.01)

(58) Field of Classification Search
CPC ...................... G06Q 30/0269; G06F 17/30598
See application file for complete search history.

(56) References Cited

U.S. PATENT DOCUMENTS

| | | | | |
|---|---|---|---|---|
| 8,655,695 B1* | 2/2014 | Qu | ..................... | G06Q 30/0251 705/14.49 |
| 2009/0006363 A1* | 1/2009 | Canny | ..................... | G06Q 30/02 |
| 2009/0070219 A1* | 3/2009 | D'Angelo | .............. | G06Q 10/10 705/14.56 |
| 2010/0257023 A1* | 10/2010 | Kendall | ................. | G06Q 30/02 705/14.46 |

(Continued)

*Primary Examiner* — Usmaan Saeed
*Assistant Examiner* — William P Bartlett
(74) *Attorney, Agent, or Firm* — Fenwick & West LLP (57) ABSTRACT

A social networking system selects advertisements for a user based on user characteristics of the user in response to a request to present an advertisement to the user. To increase the number of advertisements eligible for presentation to the user, the social networking system associates the user with one or more cluster groups associated with targeting criteria that are not satisfied by the user's characteristics. To determine whether to associate a user with a cluster group, the social networking system determines a cluster score for the cluster group based on the user's characteristics. If the cluster score equals or exceeds a cluster cutoff score for the cluster group, the user is associated with the cluster group. The cluster cutoff score may be determined based on an estimated distribution of users so that a target number or percentage of users have cluster scores less than the cluster cutoff score.

24 Claims, 5 Drawing Sheets

(56) References Cited

U.S. PATENT DOCUMENTS

| | | | |
|---|---|---|---|
| 2011/0238472 A1* | 9/2011 | Sunkada | G06Q 30/02 705/14.23 |
| 2011/0264519 A1* | 10/2011 | Chan | G06Q 30/02 705/14.49 |
| 2012/0166285 A1* | 6/2012 | Shapiro | G06Q 30/0251 705/14.58 |
| 2012/0166532 A1 | 6/2012 | Juan et al. | |
| 2012/0310745 A1* | 12/2012 | Bhatia | G06Q 30/02 705/14.66 |
| 2013/0151334 A1* | 6/2013 | Berkhin | G06Q 30/0275 705/14.52 |
| 2013/0254329 A1* | 9/2013 | Lin | G06Q 30/0255 709/217 |
| 2013/0290423 A1* | 10/2013 | Bao | H04L 67/306 709/204 |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |
| 2015/0310018 A1* | 10/2015 | Fan | G06F 17/30 707/734 |

\* cited by examiner

RUNTIME EXPANSION OF TARGETING CRITERIA BASED ON USER CHARACTERISTICS

CROSS-REFERENCE TO RELATED APPLICATION

This application claims the benefit of U.S. Provisional Application No. 61/994,443, filed May 16, 2014, which is incorporated by reference in its entirety.

BACKGROUND

This disclosure relates generally to targeted advertising and more particularly to targeted advertising in personalized digital media.

Traditionally, advertisers have attempted to tailor advertisements based on expected demographics of users. Even before the advent of broadcast media, a business advertising a product sought to purchase advertising space for that product in a publication read by typical consumers of the product. As publishing and broadcasting costs fell, more media catered to niche audiences, allowing advertisers to more finely tune advertisements to narrower groups of media consumers. Nonetheless, advertisements mainly cater to the typical consumer of media in which the advertisements are presented, causing atypical consumers of media to encounter irrelevant advertisements. With the advent of personalized digital media, advertisements may be matched to an individual user according to known traits of the user. However, producers of personalized digital media often have limited information about a user, so a producer may miss an opportunity for presenting a user with an advertisement relevant to the user because the producer lacks explicit user information indicating that the user is in the advertisement's target audience.

SUMMARY

A social networking system allows its users to more easily communicate information with each other, including sharing of content from sources external to the social networking system through the social networking system. Additionally, the social networking system maintains a user profile for each of its users, with a user profile including information describing characteristics of a corresponding user. A user of a social networking system establishes connections with other users and objects maintained by the social networking system to identify relationships between the user and other users or objects. Based on connections between the user and objects and actions of the user identified by the social networking system, the social networking system may infer characteristics of the user. Using characteristics associated with the user, the social networking system may identify advertisements more likely to be relevant to the user for presentation to the user.

To present an advertisement to a user of the social networking system, the social networking system receives a request to present an advertisement to the user. In various embodiments, the advertisement is presented to the user through an interface of the social networking system presented via a client device or through an interface provided by a third-party system affiliated with the social networking system. Based on the received request, the social networking system selects one or more advertisements for presentation to the user. To select advertisements, the social networking system compares characteristics associated with the user to targeting criteria associated with various advertisements and selects advertisements associated with at least a threshold number of targeting criteria satisfied by characteristics of the user. Targeting criteria associated with an advertisement identify characteristics of users to be presented with the advertisement, which allows the advertisement to be presented to a target audience of users having characteristics matching at least a threshold number of the targeting criteria. Hence, associating targeting criteria with an advertisement allows an advertiser associated with the advertisement to specify a target audience of users having specific characteristics for the advertisement. To expand the possible audience for an advertisement, the social networking system determines a cluster group of users having characteristics similar to user characteristics specified by the targeting criteria of the advertisement. Characteristics associated with the cluster group may be associated with the advertisement and used to identify additional users having characteristics associated with the cluster group but not having characteristics matching targeting criteria associated with the advertisement.

To determine whether users are members of a cluster group associated with targeting criteria, the social networking system trains a cluster model to determine a measure of similarity between characteristics of a user and targeting criteria. The trained cluster model is applied to characteristics of a user to generate a cluster score for the user, and the social networking system determines whether the user is a member of the cluster group based on the user's cluster score. In one embodiment, cluster model parameters are weights applied to various characteristics of a user included in the cluster model and used to generate the cluster score based on the cluster model parameters and the characteristics of the user. In one embodiment, a cluster score associated with a user is compared to a cluster cutoff score, and if the cluster score associated with the user equals or exceeds the cluster cutoff score, the user is identified as a member of the cluster group. This allows the social networking system to identify the user as eligible to be presented with advertisements associated with targeting criteria that are associated with the cluster group.

The social networking system may determine the cluster cutoff score based on a distribution of cluster scores for a sample of users. Cluster scores associated with various users in the sample of users are ranked to determine the proportion of users in the sample of users having a cluster score less than a given cluster score. In various embodiments, the social networking system selects the cluster cutoff score for a cluster as a cluster score associated with a target number or percentage of users less than the cluster score. The target number or percentage of users may be varied to modify the degree of similarity between users in the cluster group and users having characteristics satisfying at least a threshold number of targeting criteria associated with the cluster group. In some embodiments, the cluster cutoff score is determined substantially in real time without exhaustively ranking users and storing these rankings. Additionally, determining the cluster cutoff score from a real-time sampling of users accounts for changing user characteristics without performing extensive computations to update a comprehensive ranking of social networking system users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
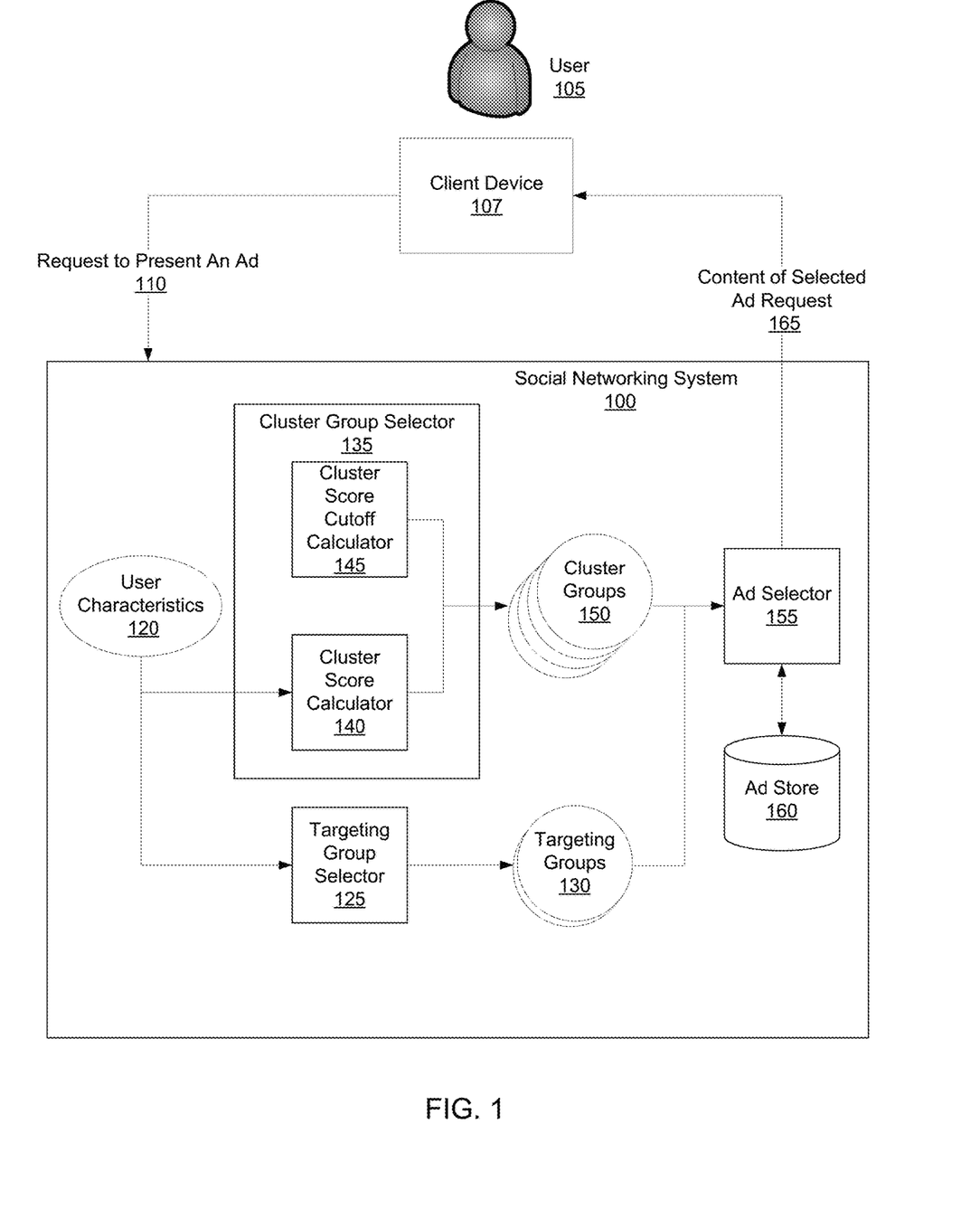
FIG. 1 is a process flow diagram illustrating advertisement selection using one or more cluster groups associated with the user, in accordance with an embodiment.

FIG. 1 is a process flow diagram illustrating advertisement selection using one or more cluster groups associated with a user, in accordance with an embodiment. A user 105 interacts with a social networking system 100. For example, the user 105 interacts with the social networking system 100 through an interface such as a webpage, an application native to an operating system on a client device 107 (e.g., a mobile phone) a third-party webpage, or a third-party application. As the user 105 interacts with the social networking system 100 via a client device 107, the social networking system 100 receives a request 110 to present an advertisement (also referred to herein as an "ad") to the user 105 from the client device 107. For example, the interface identifies one or more opportunities to present advertisements to the user 105, and causes the client device 107 to communicate the request 110 to present the advertisement to the social networking system 100. The advertisement may be presented by the interface in conjunction with content from the social networking system 100 (e.g., interspersed with content from the social networking system 100 or presented along with content from the social networking system 100). In some embodiments, the advertisement may be content provided by the social networking system 100.

After receiving the request 110 to present an ad to the user 105, the social networking system 100 selects one or more advertisements for presentation to the user 105. In one embodiment, the social networking system 100 retrieves characteristics 120 associated with the user 105 (also referred to herein as "user characteristics 120"). Examples of user characteristics 120 include information included in a user profile associated with the user 105 by the social networking system 100, connections of the user 105 to other users or objects of the social networking system 100, actions performed by the user 105 and recorded by the social networking system 100, information associated with the user and inferred by the social networking system 100, or any other suitable information. For example, the user 105 is associated with user characteristics indicating the user is a male resident of Minnesota with interests in hockey, potlucks, and lutefisk.

Based on the user characteristics 120 associated with the user 105, the targeting group selector 125 selects one or more targeting groups 130 associated with the user 105. A targeting group 130 includes one or more users having at least a threshold number of characteristics matching or satisfying targeting criteria associated with the targeting group. Generally, determination of whether a user is included in a targeting group 130 is based on comparing characteristics of the user to targeting criteria associated with the targeting group 130, without referring to characteristics of other users. For the example male resident of Minnesota identified above, the targeting group selector 125 identifies the user as included in targeting groups 130 associated with targeting criteria such as "males who like hockey" and "people who live in the Midwest and like lutefisk." The targeting group selector 125 is further described below with respect to FIG. 3.

Similarly, based on the user characteristics 120 associated with the user 105, the cluster group selector 135 selects one or more cluster groups 150 associated with the user 105. A cluster group 150 is associated with targeting criteria that are also associated with a targeting group 130, and the cluster group 150 identifies one or more users having at least a threshold number of user characteristics similar to one or more targeting criteria associated with the cluster group 150. If the user characteristics 120 of the user 105 do not match at least a threshold number of targeting criteria of a targeting group 130, the user 105 may still be associated with a cluster group 150 associated with the same targeting criteria as the targeting group 130. Hence, the cluster group increases the number of users identified as satisfying targeting criteria associated with a targeting group. In one embodiment, the cluster group selector 135 determines that the user 105 is included in a cluster group 150 based on a cluster model that determines a cluster score between characteristics of the user and targeting criteria associated with the cluster model. In the preceding example male resident of Minnesota, the user characteristics 120 of being interested in potlucks and living in Minnesota are predictive of an interest in buffets, so the cluster group selector 135 determines that the example user is a member of a cluster group 150 associated with targeting criteria specifying interest in buffets. As another example, the example male Minnesotan is unaffiliated with a fan page for the Minnesota Wild, but the cluster group selector 135 determines that the user characteristics 120 are associated with additional social networking system users having characteristics satisfying targeting criteria of "males who are connected to a fan page of the Minnesota Wild," so the cluster group selector 135 associates the user with a cluster group 150 associated with the targeting criteria "males who are connected to a fan page of the Minnesota Wild."

In the example shown by FIG. 1, the cluster group selector 135 includes a cluster score calculator 140 and a cluster cutoff score calculator 145. The cluster score calculator 140 determines a cluster score of the user 105 for a cluster group 150. A cluster score provides a measure of the user's affinity for content associated with targeting criteria associated with the cluster group based on user characteristics 120 of the user 105. In one embodiment, the cluster score of the user 105 for a cluster group 150 is calculated using a cluster model that determines an affinity of the user 105 for content associated with targeting criteria associated with the cluster group 150 based on the user characteristics 120 (or a subset thereof). The cluster model may include pre-computed cluster model parameters determined from characteristics of various social networking system 100 users and apply the cluster model parameters to user characteristics 120 to generate the cluster score.

The cluster score from the cluster score calculator 140 is compared against a cluster cutoff score associated with a cluster group 150 determined by the score cutoff calculator 145. If the cluster score for the user 105 equals or exceeds the cluster cutoff score for a cluster group 150, then the user 105 is associated with the cluster group 150. In various embodiments, the score cutoff calculator 145 determines the cluster cutoff score based on the cluster scores of various social networking system users with respect to the cluster group 150. The cluster cutoff score represents a minimum affinity for a user for content associated with the targeting criteria associated with the cluster group 150. In one embodiment, the cluster cutoff score is determined from an estimated distribution of cluster scores for the cluster group 150 by users of the social networking system 100 (or a subset of users of the social networking system 100, e.g., users in a country). The cluster cutoff score is a cluster score in the distribution below which a target number or percentage of users have cluster scores. For example, the cluster cutoff score identifies a cluster score greater than 95% of cluster scores for the cluster group 150. The number or percentage of users may be modified by the social networking system 100 or by an advertiser to regulate a number of users associated with a cluster group. The cluster group selector 135, score cutoff calculator 145, and the cluster score calculator 140 are further described in conjunction with FIG. 3 and FIG. 4.

In one embodiment, the cluster group selector 135 computes cluster scores of the user 105 for multiple cluster groups 150 and determines cluster cutoff scores associated with the multiple cluster groups 150. The cluster group selector 135 associates the user 105 with cluster groups 150 for which the cluster score of the user 105 for a cluster group 150 equals or exceeds a cluster cutoff score for the cluster group 150. Alternatively, the cluster group selector 135 retrieves targeting criteria associated with an advertisement request from the ad store 160 and determines whether the user 105 is associated with a cluster group 150 that is associated with the targeting criteria associated with the advertisement request.

Based on targeting criteria associated with the targeting groups 130 and with the cluster groups 150, an ad selector 155 included in the social networking system 100 retrieves ad requests from the ad store 160. The ad store 160 includes advertisement requests from advertisers. An advertisement request ("ad request") includes advertisement content (e.g., text, an image, a video, an animation), a bid amount, and may also include targeting criteria and other parameters (e.g., an expiration date of the ad request, a time of day to present the ad). An ad request that does not include targeting criteria is eligible for presentation to any social networking system user, regardless of cluster groups 150 and/or targeting groups 130 associated with the user. However, an ad request including targeting criteria is eligible for presentation to social networking system users associated with a targeting group 130 or a cluster group 150 that is associated with the targeting criteria and is not eligible for presentation to social networking system users that are not associated with a targeting group 130 or a cluster group 150 that is associated with the targeting criteria. From the retrieved ad requests, the ad selector 155 selects an ad request for presentation to the user based at least in part on bid amounts associated with the retrieved ad requests. The content of a selected ad request 165 is communicated from the social networking system 100 to the client device 107 for presentation to the user 105. The ad store 160 and the ad selector 155 are further described below in conjunction with FIG. 3.

Referring to the previous example resident of Minnesota, the ad selector 155 retrieves ad requests including targeting criteria of "hockey" and "potluck," as this user is associated with targeting groups 130 associated with these targeting criteria, and also retrieves ad requests related to buffets and Minnesota Wild apparel based on the targeting criteria associated with cluster groups 150 associated with the user as discussed above. The ad selector 155 selects one or more of the retrieved ad requests and presents content from the selected ad request 165 to the example user.

System Architecture

Figure 2:
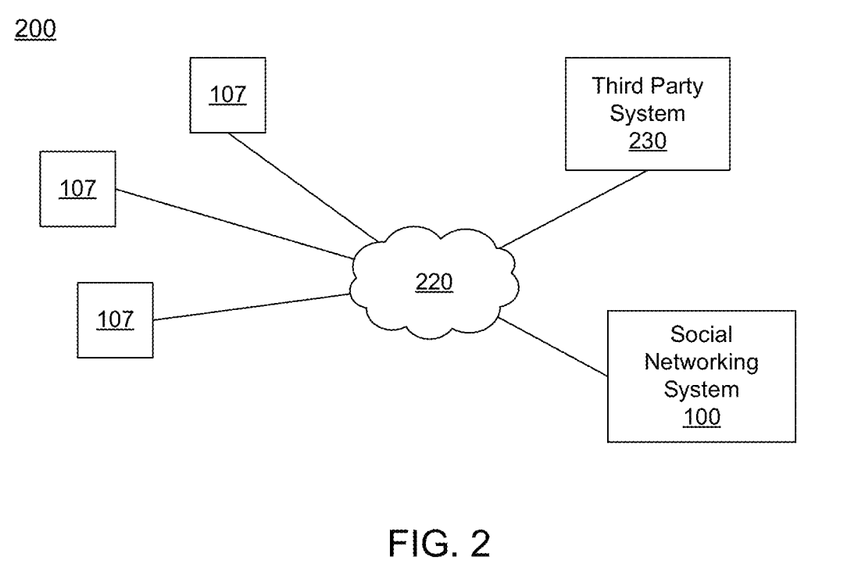
FIG. 2 is a block diagram of a system environment in which a social networking system operates, in accordance with an embodiment.

FIG. 2 is a high level block diagram of a system environment 200 for a social networking system 100. The system environment 200 shown by FIG. 2 comprises one or more client devices 107, a network 220, one or more third-party systems 230, and the social networking system 100. In alternative configurations, different and/or additional components may be included in the system environment 200. The embodiments described herein may be adapted to online systems that are not social networking systems.

The client devices 107 are one or more computing devices capable of receiving user input as well as transmitting and/or receiving data via the network 220. In one embodiment, a client device 107 is a conventional computer system, such as a desktop or laptop computer. Alternatively, a client device 107 may be a device having computer functionality, such as a personal digital assistant (PDA), a mobile telephone, a smartphone or another suitable device. A client device 107 is configured to communicate via the network 220. In one embodiment, a client device 107 executes an application allowing a user of the client device 107 to interact with the social networking system 100. For example, a client device 110 executes a browser application to enable interaction between the client device 107 and the social networking system 100 via the network 220. In another embodiment, a client device 107 interacts with the social networking system 100 through an application programming interface (API) running on a native operating system of the client device 107, such as IOS® or ANDROID™.

The client devices 107 are configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 230 may be coupled to the network 220 for communicating with the social networking system 100, which is further described below in conjunction with FIG. 3. In one embodiment, a third party system 230 is an application provider communicating information describing applications for execution by a client device 107 or communicating data to client devices 107 for use by an application executing on the client device. In other embodiments, a third party system 230 provides content or other information for presentation via a client device 107. A third party system 230 may also communicate information to the social networking system 100, such as advertisements, content, or information about an application provided by the third party website 230.

Figure 3:
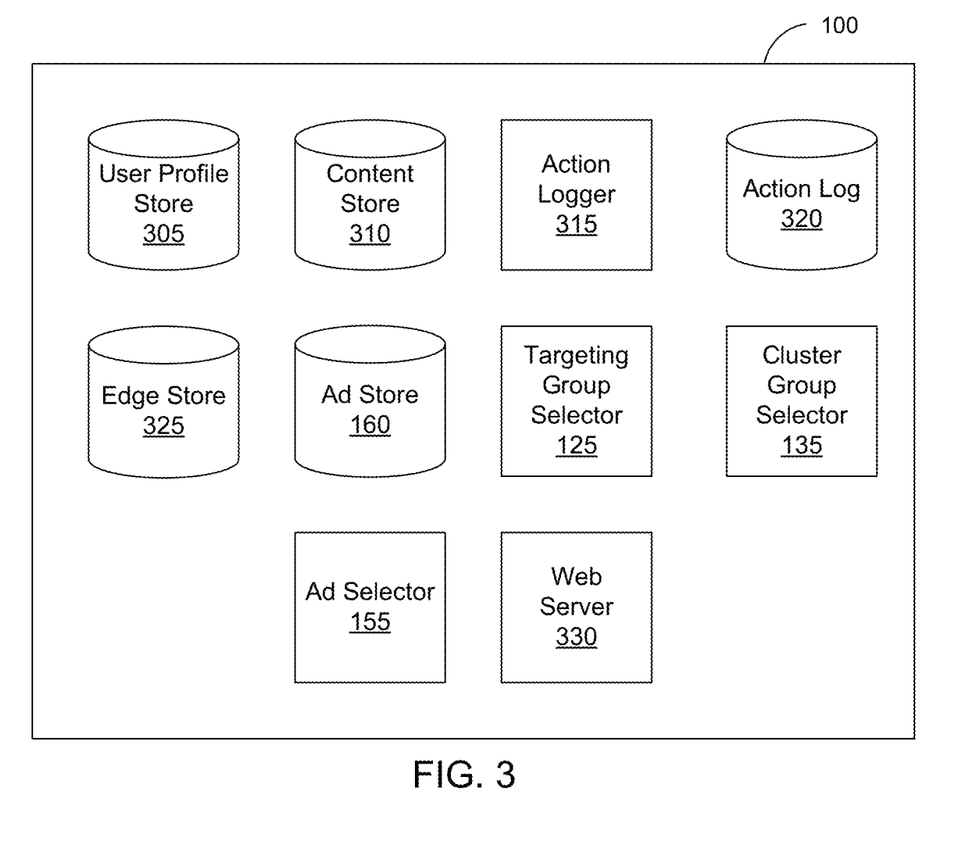
FIG. 3 is a block diagram of a social networking system, in accordance with an embodiment.

FIG. 3 is an example block diagram of an architecture of the social networking system 100. The social networking system 100 shown in FIG. 3 includes a user profile store 305, a content store 310, an action logger 315, an action log 320, an edge store 325, a targeting group selector 125, a cluster group selector 135, an ad selector 155, an ad store 160, and a web server 330. In other embodiments, the social networking system 100 may include additional, fewer, or different components for various applications. Conventional components such as network interfaces, security functions, load balancers, failover servers, management and network operations consoles, and the like are not shown so as to not obscure the details of the system architecture.

Each user of the social networking system 100 is associated with a user profile, which is stored in the user profile store 205. A user profile includes declarative information about the user that was explicitly shared by the user and may also include profile information inferred by the social networking system 100. In one embodiment, a user profile includes multiple data fields, each describing one or more attributes of the corresponding social networking system user. Examples of information stored in a user profile include biographic, demographic, and other types of descriptive information, such as work experience, educational history, gender, age, relationship status, hobbies or preferences, location, country, languages spoken, and the like. A user profile may also store other information provided by the user, for example, images or videos. In certain embodiments, images or videos of users may be tagged with information identifying the social networking system users displayed in an image. A user profile in the user profile store 305 may also maintain references to actions by the corresponding user performed on content items in the content store 310 and stored in the action log 320.

While user profiles in the user profile store 305 are frequently associated with individuals, allowing individuals to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system 100 using a brand page associated with the entity's user profile. Other users of the social networking system 100 may connect to the brand page to receive information posted to the brand page or to receive information from the brand page. A user profile associated with the brand page may include information about the entity itself, providing users with background or informational data about the entity.

The content store 310 stores objects that represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 310, such as status updates, images or videos tagged by users to be associated with other objects in the social networking system 100, events, groups or applications. In some embodiments, objects are received from third-party applications or third-party applications separate from the social networking system 100. In one embodiment, objects in the content store 310 represent single pieces of content or content "items." Hence, social networking system users are encouraged to communicate with each other by posting text and content items of various types of media to the social networking system 100 through various communication channels. This increases the amount of interaction of users with each other and increases the frequency with which users interact within the social networking system 100.

The action logger 315 receives communications about user actions internal to and/or external to the social networking system 100, populating the action log 320 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 320.

The action log 320 may be used by the social networking system 100 to track user actions on the social networking system 100, as well as actions on third party systems 230 that communicate information to the social networking system 100. Users may interact with various objects on the social networking system 100, and information describing these interactions is stored in the action log 310. Examples of interactions with objects include: commenting on posts, sharing links, and checking-in to physical locations via a mobile device, accessing content items, and any other suitable interactions. Additional examples of interactions with objects on the social networking system 100 that are included in the action log 320 include: commenting on a photo album, communicating with a user, establishing a connection with an object, joining an event, joining a group, creating an event, authorizing an application, using an application, expressing a preference for an object ("liking" the object) and engaging in a transaction. Additionally, the action log 320 may record a user's interactions with advertisements on the social networking system 100 as well as with other applications operating on the social networking system 100. In some embodiments, data from the action log 320 is used to infer user characteristics of a user (e.g., interests or preferences), augmenting the user characteristics included in the user's user profile and allowing a more complete understanding of user attributes and interests.

The action log 320 may also store user actions taken on a third party system 230, such as an external website, and communicated to the social networking system 100. For example, an e-commerce website may recognize a user of a social networking system 100 through a social plug-in enabling the e-commerce website to identify the user of the social networking system 100. Because users of the social networking system 100 are uniquely identifiable, e-commerce websites, such as in the preceding example, may communicate information about a user's actions outside of the social networking system 100 to the social networking system 100 for association with the user. Hence, the action log 320 may record information about actions users perform on a third party system 230, including webpage viewing histories, advertisements that were engaged, purchases made, and other patterns from shopping and buying.

In one embodiment, the edge store 325 stores information describing connections between users and other objects on the social networking system 100 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 100, such as expressing interest in a page on the social networking system 100, sharing a link with other users of the social networking system 100, and commenting on posts made by other users of the social networking system 100.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 100, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 325 also stores information about edges, such as affinity scores for objects, interests, and other users. Affinity scores, or "affinities," may be computed by the social networking system 100 over time to approximate a user's interest for an object, a topic, or another user in the social networking system 100 based on the actions performed by the user. A user's affinity may be computed by the social networking system 100 over time to approximate a user's affinity for an object, interest, and other users in the social networking system 100 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 325, in one embodiment. Alternatively, each interaction between a user and a specific object is stored as a separate edge. In some embodiments, connections between users may be stored in the user profile store 305, or the user profile store 305 may access the edge store 325 to determine connections between users.

One or more advertisement requests ("ad requests") are included in the ad store 160. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 100 if the advertisement is presented to a user, if the advertisement receives a user interaction, or if another suitable condition is fulfilled. For example, the bid amount specifies a monetary amount that the social networking system 100 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 100. Targeting criteria may also specify interactions between a user and objects performed external to the social networking system 100, such as on a third party system 230. For example, targeting criteria identify users that have taken a particular action, such as sending a message to another user, using an application, joining a group, leaving a group, joining an event, generating an event description, purchasing or reviewing a product or service using an online marketplace, requesting information from a third-party system 230, or any other suitable action. Including actions in the targeting criteria allows advertisers to further refine users eligible to be presented with content from an advertisement request. As another example, targeting criteria identify users having a connection to another user or object or having a particular type of connection to another user or object.

The targeting group selector 125 identifies targeting groups associated with a user identified in a request to present an advertisement. Users associated with a targeting group are users having at least a threshold number or percentage of characteristics satisfying targeting criteria associated with the targeting group. The targeting group selector 125 may retrieve user characteristics from one or more of the user profile store 305, the action log 320, and the edge store 325. To identify targeting groups associated with a user, the targeting group selector 125 compares characteristics of the user to targeting criteria associated with various targeting groups and identifies targeting groups associated with at least a threshold number of targeting criteria satisfied by the characteristics of the user. The targeting group selector 125 may store identifiers associated with various targeting groups and user identifiers associated with each targeting group specifying users associated with each targeting group. Alternatively, the targeting group selector 125 includes an identifier of one or more targeting groups associated with a user in a user profile associated with the user and included in the user profile store 205. Alternatively, the targeting group selector 125 retrieves an ad request from the ad store 160 and determines whether characteristics of the user satisfy targeting criteria associated with the ad request.

The cluster group selector 135 identifies one or more cluster groups associated with a user. A user associated with a cluster group is a user having at least a threshold affinity for content associated with targeting criteria associated with the cluster group. In one embodiment, the cluster group selector 135 retrieves user characteristics from one or more of the user profile store 305, the action log 320, and the edge store 325. If a user does not have characteristics satisfying targeting criteria associated with a targeting group, based on additional characteristics associated with the user, the user may be associated with a cluster group associated with the targeting criteria. In one embodiment, the cluster group selector 135 associates a cluster group that is associated with targeting criteria with a user if a cluster group score representing a measure of the user's affinity for content associated with the targeting criteria has at least a threshold value. The cluster group selector 135 may store identifiers associated with various cluster groups and user identifiers associated with each cluster group specifying users associated with each cluster group. Alternatively, the cluster group selector 135 includes an identifier of one or more cluster groups associated with a user in a user profile associated with the user and included in the user profile store 205. In another embodiment, the cluster group selector 135 retrieves an ad request from the ad store 160 and determines whether the user is associated with a cluster group associated with targeting criteria specified by the ad request if the user is not associated with characteristics satisfying the targeting criteria specified by the ad request. The cluster group selector 135 is further described below in conjunction with FIGS. 4-7.

The ad selector 155 selects one or more advertisements from the ad store 160 for presentation to the user in response to a request to present an advertisement to the user. In one embodiment, the ad selector 155 identifies targeting groups and cluster groups associated with a user and retrieves ad requests having targeting criteria associated with the identified cluster groups and targeting groups. Alternatively, the ad selector 155 receives ad requests specifying targeting criteria associated with targeting groups or cluster groups that are associated with the user. Hence, the targeting criteria associated with targeting groups and cluster groups associated with the user filter ads that may be selected for presentation to the user. The ad selector 155 may retrieve additional user characteristics from the user profile store 305, the content store 310, the action log 320, and the edge store 325 and account for the additional user characteristics when evaluating ad requests. Based on characteristics of the user ("user characteristics") the ad selector 155 determines a user's likelihood of interacting with the content of various ad requests. In one embodiment, the ad selector 155 uses an auction process to rank ad requests according to expected values to the social networking system 100 for presenting content from various ad requests, with an expected value of an ad request based on a bid amount associated with the ad request and a determined likelihood of the user interacting with content in the ad request. Based the ranking from the auction process, the ad selector 155 selects one or more ad requests and communicates content of selected ad requests to a client device 107 or to a third-party system 230 for presentation to the user. The web server 350 communicates content from the selected one or more ad requests to a client device 107 or a third-party system 230 for presentation.

The web server 330 links the social networking system 100 via the network 220 to the one or more client devices 107, as well as to the one or more third party systems 230. The web server 240 serves web pages, as well as other web-related content, such as JAVA®, FLASH®, XML and so forth. The web server 330 may receive and route messages between the social networking system 100 and the client device 107, for example, instant messages, queued messages (e.g., email), text messages, short message service (SMS) messages, or messages sent using any other suitable messaging technique. A user may send a request to the web server 330 to upload information (e.g., images or videos) that are stored in the content store 310. Additionally, the web server 330 may provide application programming interface (API) functionality to send data directly to native client device operating systems, such as IOS®, ANDROID™, WEBOS®, or BlackberryOS.

Cluster Group Selector Architecture

Figure 4:
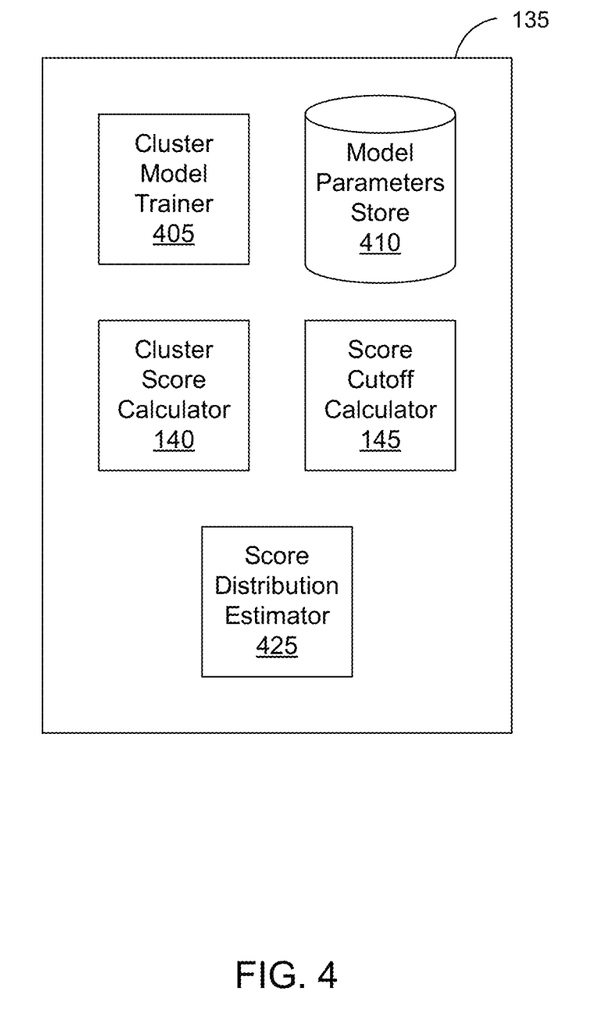
FIG. 4 is a block diagram of a cluster group selector module, in accordance with an embodiment.

FIG. 4 is a block diagram of one embodiment of the cluster group selector module 135. In the embodiment shown by FIG. 4, the cluster group selector module 135 includes a cluster model trainer 405, a model parameters store 410, a cluster score calculator 140, a score cutoff calculator 145, and a score distribution estimator 425. However, in other embodiments, cluster group selector module 135 may include additional, fewer, or different components than those described in conjunction with FIG. 4.

The cluster model trainer 405 determines cluster model parameters, which are values applied to various characteristics of a user to generate a cluster score for the user based on the user's characteristics and the values. For example, the cluster model parameters are weights applied to various characteristics of a user by a cluster model to generate a cluster score by combining the weighted user characteristics. To determine cluster model parameters for a cluster model associated with a cluster group, the cluster model trainer 405 identifies users associated with a targeting group associated with the same targeting criteria as the cluster group and retrieves characteristics corresponding to users in the targeting group. Characteristics of users associated with the targeting group associated with the same targeting criteria as the cluster group may be retrieved from one or more of the user profile store 305, the action log 320, and the edge store 325. Based on the retrieved characteristics, the cluster model trainer 405 determines cluster model parameters for application to various user characteristics to determine a measure of affinity of the user for content associated with targeting criteria associated with a cluster group. For example, the cluster model trainer 405 identifies various combinations of characteristics of a user associated with the targeting group, and determines cluster model values for determining an affinity of a user for content associated with targeting criteria associated with the targeting group based on the combinations of characteristics of users associated with the targeting group. The cluster model trainer 405 determines cluster model parameters associated with various user characteristics and trains a cluster model associated with the cluster group to determine an affinity of a user for content associated with the targeting criteria associated with the cluster group. Determination of cluster model parameters is further described below in conjunction with FIGS. 5 and 6. The cluster model parameters associated with a cluster group are stored in the model parameters store 410.

Using the cluster model parameters determined by the cluster model trainer 405 for a cluster group, the cluster score calculator 140 determines a cluster score between the user and the cluster group. This cluster score represents a measure of a user's affinity for content associated with targeting criteria that is associated with the cluster group based on characteristics of the user. Characteristics of a user may be retrieved from one or more of the user profile store 305, the action log 320, and the edge store 325. The cluster score is determined from the cluster model associated with the cluster group and trained by the cluster model trainer 405. The cluster model predicts an affinity of a user for content associated with targeting criteria associated with the cluster group, which provides an indication of a likelihood of the user interacting with content associated with targeting criteria that is associated with the cluster group. When determining a cluster score associated with a user, the cluster score calculator 140 may use a subset of the user's characteristics to determine the cluster score between the user and a cluster group.

The cluster score from the cluster score calculator 140 is compared to a cluster cutoff score determined by the score cutoff calculator 145. If the cluster score between a user and a cluster group is greater than or equal to the cluster cutoff score for the cluster group, the user is associated with the cluster group. A user associated with a cluster group is eligible to be presented with content from ad requests including targeting criteria matching targeting criteria associated with the cluster group. The score cutoff calculator 145 determines the cluster score based on cluster scores of multiple social networking system users with respect to the cluster group. In one embodiment, the score cutoff calculator 145 determines the cluster cutoff score from an estimated distribution of cluster scores of social networking system users, or of a subset of social networking system users (e.g., users in a country, users in a city, users speaking a common language) for the cluster group. For example, the cluster cutoff score is a cluster score in the distribution below which a target number or percentage of users have cluster scores. For example, the cluster cutoff score corresponds to the top-five percent of cluster scores for the cluster group. The target number or percentage of users specifying a cluster cutoff score for a cluster group may be adjusted by the social networking system 100 or by an advertiser to modify users associated with the cluster group.

The score distribution estimator 425 determines an estimated distribution of cluster scores associated with a cluster group based on cluster scores computed by the cluster score calculator 140 between the cluster group and various users. Cluster scores between various users and the cluster group may be ranked to determine an estimated cumulative distribution of users. For example, the estimated distribution of users indicates the cluster scores corresponding to the tenth, fiftieth, and ninetieth percentiles of users as ranked by cluster scores. In one embodiment, the score distribution estimator 425 implements a distributed estimator to compute cluster cutoff scores substantially in real time. Alternatively or additionally, the score distribution estimator 425 stores an estimated distribution (or data fitting parameters to recreate the distribution) of cluster scores associated with a cluster group and updates the estimated distribution when the cluster score calculator 140 determines a cluster score between a user and the cluster group. Hence, the cluster group selector module 135 associates users associated with a cluster score associated with a cluster group that equals or exceeds a cluster score for the cluster group associated with the target number or percentage of users.

Advertisement Selection for a User in a Cluster Group

Figure 5:
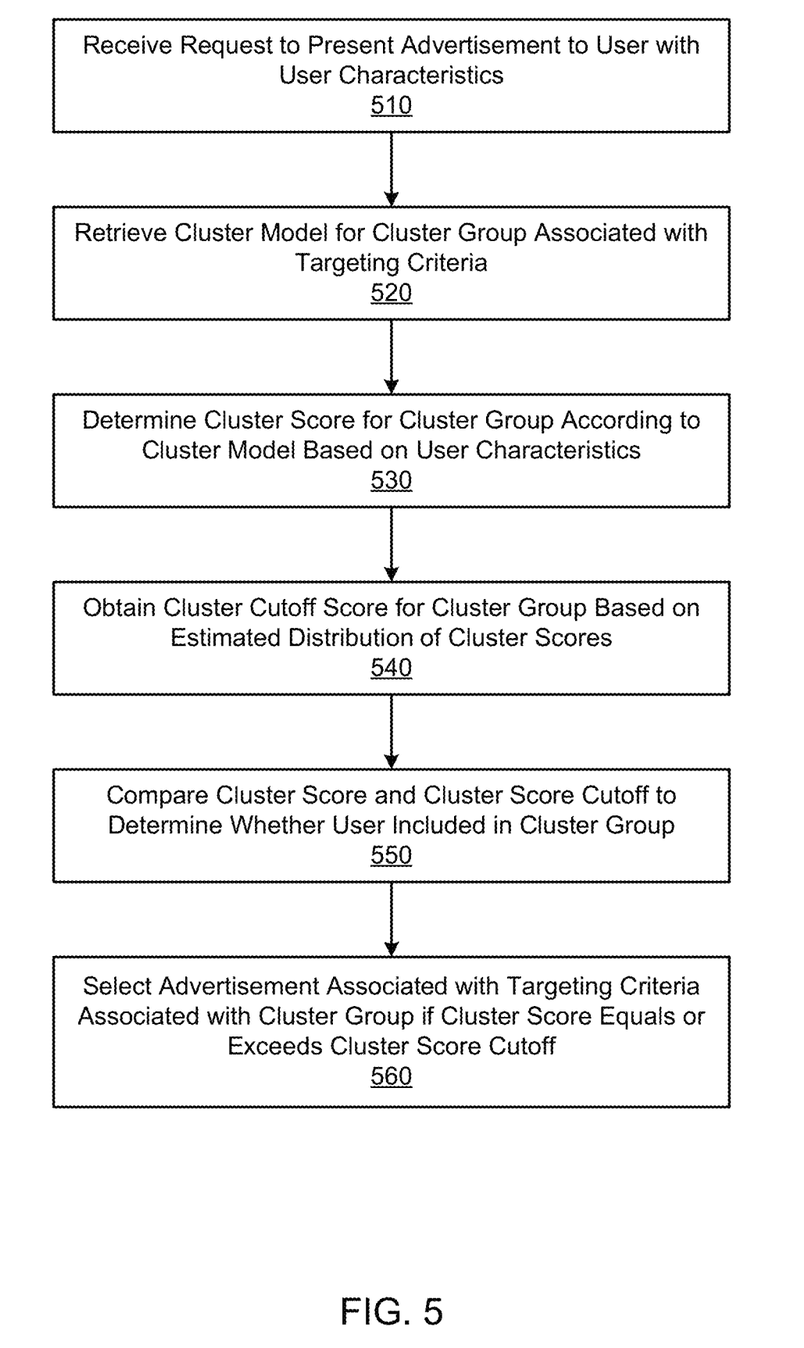
FIG. 5 is a flowchart of a process for selecting an advertisement for presentation to a user using one or more cluster groups associated with the user, in accordance with an embodiment.

FIG. 5 is a flowchart of one embodiment of a process for selecting an advertisement for presentation to a user using a cluster group. The social networking system 100 receives 510 a request to present an advertisement to a user. For example, the request is received 510 from a client device 107 through the web server 330. As another example, the request is received 510 from a third-party system 230 via the web server 330. For example, the request is received 510 when a user accesses content provided by the social networking system 100 or when the user accesses the third-party system 230 using information associated with the user and maintained by the social networking system 100.

In response to receiving 510 the request, the social networking system 100 retrieves user characteristics of the user from one or more of the user profile store 305, the action log 320, and the edge store 325. Example characteristics of the user include demographic information, age, geographic location, relationship status, country, languages spoken. Other example characteristics include a number of one or more types of actions performed by the user, a frequency with which the user performs one or more types of actions, or a number of one or more types of actions performed within a time interval (e.g., number of logins, frequency of posts, number of tagged photos within the last year, number of location check-ins during the month before Christmas). Other example characteristics include explicit or implicit connections between the user and other users or objects via the social networking system 100, a number of connections between the user and other users or objects (e.g., a number of connections between the user and a specific type of object), or a connection to a type of object.

Based on the retrieved user characteristics, the social networking system 100 determines whether the user characteristics satisfy targeting criteria associated with an advertisement request. If the social networking system 100 determines the user characteristics do not satisfy targeting criteria associated with the advertisement request, the social networking system 100 determines whether the user is associated with a cluster group that is associated with the targeting criteria associated with the advertisement request. Alternatively, the social networking system 100 determines whether the user is associated with a cluster group that is associated with the targeting criteria associated with the advertisement request. In one embodiment, the social networking system 100 determines one or more cluster groups associated with the user and determines if the user is associated with a cluster group associated with the targeting criteria associated with the advertisement request. As described above in conjunction with FIGS. 1 and 3, a cluster group is associated with one or more targeting criteria By identifying one or more cluster groups associated with a user, the social networking system 100 identifies targeting criteria to associate with the user even though characteristics of the user do not satisfy the targeting criteria. This allows the social networking system 100 to identify additional advertisements or other content for presentation to the user, even though the user is not associated with at least a threshold number of characteristics that satisfy the targeting criteria.

The social networking system 100 selects a cluster group, such as a cluster group associated with targeting criteria specified by a retrieved advertisement request, and retrieves 520 a cluster model associated with the cluster group. The cluster model may include a set of cluster model parameters. Based on the cluster model and the characteristics of the user, the social networking system 100 determines 530 a cluster score of the user for the cluster group. The cluster score provides a measure of the user's affinity for an advertisement or other content associated with the targeting criteria associated with the cluster group.

Various cluster techniques may be used to determine the cluster model associated with a cluster group. In various embodiments, the cluster model implements machine learning and/or statistical techniques. For example, the cluster model is a statistical classifier using a weighted linear combination of values corresponding to user characteristics (or a logistic function of the weighted linear combination), with the cluster model parameters used as weights of the linear combination. As another example, the cluster model is an unsupervised machine learning algorithm, such as an artificial neural network, and the cluster model parameters are weights of connections between input, hidden, and output layers of the neural network. Cluster model parameters of the cluster model may be pre-computed and stored in the model parameters store 410 to more efficiently associate the user with one or more cluster groups. The cluster model parameters may be recomputed periodically, or they may be updated (e.g., by a weighted average) based on additional data. Updating cluster model parameters associated with a cluster group when requests for advertisements are received 510 allows cluster model parameters to better reflect characteristics of users that actively interact with the social networking system 100, which may reduce the accuracy of cluster scores generated for infrequent users of the social networking system 100 while increasing the accuracy of cluster scores determined for users that frequently interact with the social networking system 100. Alternatively, the cluster model parameters may be computed in real time.

Figure 6:
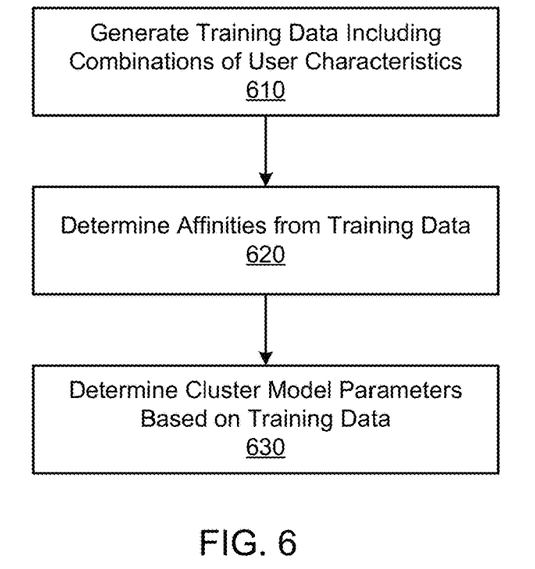
FIG. 6 is a flowchart of a process for determining parameters of a cluster model, in accordance with an embodiment.

FIG. 6 is a flowchart of a process of one embodiment for determining cluster model parameters used by a cluster model. The social networking system 100 generates 610 training data for a cluster group based on characteristics of users associated with a targeting group that is associated with the same targeting criteria as the cluster group. In one embodiment, the training data for a cluster group is generated 610 by randomly sampling users in a targeting group associated with targeting criteria that is also associated with the cluster group. Alternatively or additionally, the training data may include characteristics of randomly selected social networking system users. From the characteristics of the users in the targeting group or from the randomly selected social networking system users, the social networking system 100 identifies various user characteristics or combinations of user characteristics. An example combination of user characteristics is a binary value indicating whether a user is a West Coast resident and an indication of whether the user has a check-in at a sushi restaurant. Examples of user characteristics include a number of posts made by the user about sushi or a binary value indicating whether the user is connected to an object representing fish and chips.

The social networking system 100 determines 620 affinities for content associated with targeting criteria associated with the cluster group for different user characteristics and combinations of user characteristics determined from the training data. The determined affinities provide a measure of a user having different user characteristics or combinations of user characteristics in content associated with targeting criteria associated with the cluster group. Hence, the determined affinities provide an indication of a likelihood of a user having a combination of characteristics or having a characteristic such as interacting with content associated with the targeting criteria.

The social networking system 100 determines 630 cluster model parameters based on targeting probabilities for different user characteristics and combinations of user characteristics. Cluster model parameters may be determined 630 using various methods depending on a type of cluster model used. For example, if the cluster model is a linear regression, a multinomial regression is performed on the values of the user characteristics and the combinations of user characteristics as well as targeting probabilities associated with user characteristics and combinations of user characteristics. If the cluster model is a logistic function, a multinomial logistic regression is performed on values of the user characteristics, the combinations of user characteristics and the targeting probabilities. If an artificial neural network cluster model is used, the cluster model parameters are determined using an iterative process to minimize a cost function over the training data.

Returning to FIG. 5, the social networking system 100 determines 530 a cluster score for the cluster group based on the retrieved cluster model parameters and a cluster model (e.g., a logistic function, an artificial neural network). The cluster score provides an affinity of the user for content associated with the targeting criteria that are associated with the cluster group. For example, if a cluster group is associated with targeting criteria of a connection to an object having a topic of "sushi," a user having characteristics of check-ins at sushi restaurants, posts mentioning sushi, and a residence in a West Coast metropolis has a higher cluster score, based on characteristics of users associated with a targeting group associated with the same targeting criteria, than a user having characteristics of posts mentioning fish and chips and a residence in the rural Midwest.

In addition to determining a cluster score between the user and cluster group, a cluster cutoff score is obtained 540 for the cluster group. In one embodiment, the cluster cutoff score is obtained 540 from a third-party. For example, a received ad request includes a cluster cutoff score specified by an advertiser. In one embodiment, obtaining the cluster cutoff score includes determining the cluster cutoff score in real time in response to the request to present an advertisement. The cluster cutoff score may also be obtained 540 from a previously determined cluster cutoff score (e.g., in response to a previous request for an advertisement, in response to creation of the cluster group, as part of a periodic process to update the cluster cutoff score for a cluster group). In one embodiment, the cluster cutoff score is based on an estimated distribution of cluster scores and a target number or percentage of users. A specific cluster score in the distribution of cluster scores is associated with a number or percentage of users with cluster scores greater than or equal to the specific score and a number or percentage of users with cluster scores less than the specific cluster score. The cluster cutoff score corresponds to a cluster score where at least a target number or percentage of users have cluster scores less than the cluster cutoff score. For example, the target percentage of users is ninety percent, so the cluster cutoff score is determined as the cluster score with which ninety percent of users have cluster scores less than the cluster cutoff score. The target number or percentage may be specified or modified by an advertiser in an ad request or may be determined or modified by the social network 100. In some embodiments, the social networking system 100 modifies the cluster cutoff score for a cluster group based on one or more ad requests for the cluster group. For example, the social networking system 100 decreases the target number or percentage of users when determining the cluster cutoff score for a cluster group to increase the number of users eligible to be presented with content of an ad request including targeting criteria associated with the cluster group.

Figure 7:
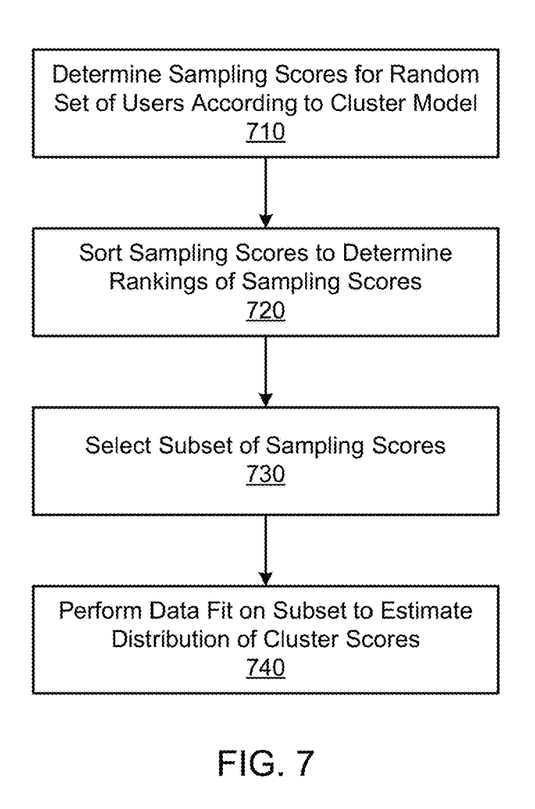
FIG. 7 is a flowchart of a process for determining a cluster cutoff score based on an estimated distribution of cluster scores, in accordance with an embodiment.

FIG. 7 is a flowchart of one embodiment of a process for determining a cluster cutoff score for a cluster group based on an estimated distribution of cluster scores. The social networking system 100 selects a set of users, such as a random set of users, and determines 710 sampling scores for users in the selected set based on characteristics of various users in the set, cluster parameters associated with the cluster group, and the cluster model. The sampling scores are sorted 720 to determine rankings of the sampling scores. For example, if one hundred sampling scores are determined for one hundred users, than the ninetieth score among the scores sorted low to high corresponds to a sampling score marking the ninetieth percentile of scores.

From the sorted sampling scores, the social networking system 100 may optionally select 730 of a subset of sampling scores. When selecting 730 the subset, the social networking system 100 selects 730 an increased number of sampling scores having rankings within a threshold amount of the target number or percentage than having rankings greater than the threshold amount from the target number or percentage. The target number or percentage for the cluster cutoff score may be a relatively large percentage or number (e.g., the ninety-fifth percentile), so a relatively higher number of sampling scores are selected 730 from above the target number or percentage of users (cluster cutoff score) than below the target number or percentage of users (cluster cutoff score). By selecting 730 a subset of sampling scores having rankings within a threshold amount of the target number or percentage of users, the social networking system 100 more accurately discerns between users having cluster scores having less than a threshold difference from the cluster cutoff score. While this biased sampling may reduce the accuracy of the score distribution estimate for users with cluster scores greater than a threshold amount from the cluster cutoff score, these users have a low likelihood for being inaccurately associated with or not associated with the cluster group.

Based on the selected subset of sampling scores, the social networking system 100 performs 740 a data fit between the sampling scores and the determined rankings of the sampling scores. For example, the data fit is performed 740 using a regression technique to fit the sampling scores and determined rankings to a function, or the data fit is performed 740 to approximate the data as a piecewise function. In various embodiments, the complete distribution does not need to be determined for the social networking system 100 to determine the cluster cutoff score. The social networking system 100 may use a distributed estimator to determine the cluster cutoff score or the distribution of cluster scores. In a distributed estimator, multiple computational nodes (e.g., processors) are arranged in a network and sample users to determine sampling scores and rankings. The computational nodes communicate results with neighboring computational nodes until a consensus is reached (e.g., a majority of computational nodes agree on a cluster cutoff score within a tolerance); any suitable distributed estimation algorithm (e.g., the consensus algorithm) may be used. The social networking system 100 may incrementally update a data fit of a known cluster score distribution for a cluster group based on previously determined cluster scores for users in response to requests to present ads to those users.

Returning to FIG. 5, the social networking system 100 compares 550 the determined cluster cutoff score for the cluster group and the determined cluster score between the user and the cluster group to determine if the user is associated with the cluster group. In one embodiment, the user is associated with the cluster group if the cluster score for the user equals or exceeds the cluster cutoff score. If a user is associated with the cluster group, the user has at least a threshold affinity for content associated with targeting criteria associated with the cluster group, indicating that the user has a relatively higher likelihood of interacting with content associated with the targeting criteria associated with the cluster group; hence, the association with the cluster group identifies the user as eligible to receive advertisements associated with targeting criteria associated with the cluster group. In various embodiments, the social networking system 100, retrieves 520 cluster model parameters for multiple cluster groups, determines 530 cluster scores for the user and each of the multiple cluster groups, obtains 540 a cluster cutoff score for each of the multiple cluster groups, and compares 550 cluster scores for each cluster group with a cluster cutoff score for each cluster group to identify one or more cluster groups associated with the user. Hence, the social networking system 100 may associate a user with multiple cluster groups each associated with different targeting criteria.

Based on one or more cluster groups associated with the user and targeting criteria associated with each of the cluster groups associated with the user, the social networking system 100 selects 560 one or more advertisements for presentation to the user. In one embodiment, the social networking system 100 retrieves ad requests from the ad store 160 specifying targeting criteria matching targeting criteria of at least one cluster group associated with the user. The social networking system 100 may also retrieve ad requests associated with targeting criteria matching the targeting criteria of one or more targeting groups associated with the user. The retrieved ad requests are provided to a selection process, such as an auction, to select one or more ad requests for presentation to the user. Based on bid amounts associated with the selected ad request, the social networking system 100 selects 560 one or more ad requests and presents content from the selected ad requests to the user; additional information, such as the user's likelihood of interacting with content included in various ad request may be used along with the ad requests' bid amounts to rank the ad requests, with one or more ad requests selected based on the ranking. Content from one or more of the selected ad requests are communicated from the social networking system 100 to a client device 107 or a third-party system 230 for presentation to the user.

In various embodiments, cluster groups and targeting groups associated with a user may be determined differently than described above. For example, a cluster group is associated with users that are not associated with characteristics matching at least a threshold number of targeting criteria but that have at least a threshold likelihood of interacting with content associated with the targeting criteria. Alternatively, users having characteristics with a threshold similarity to characteristics of users in a targeting group are associated with a cluster group so the cluster group also includes users associated with the targeting group.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request to present an advertisement to a user of a social networking system;
   retrieving an advertisement request associated with targeting criteria from the social networking system;
   retrieving user characteristics of the user maintained by the social networking system;
   determining whether the user characteristics of the user satisfy targeting criteria associated with the advertisement;
   responsive to determining the user characteristics do not satisfy the targeting criteria associated with the advertisement, and after receiving the request to present an advertisement to the user, determining whether to include the user within each of a plurality of pre-defined cluster groups that are each associated with the targeting criteria by:
      determining, by a processor for each of the plurality of pre-defined cluster groups, a cluster score for the user based at least in part on a cluster model and additional characteristics of the user, wherein the cluster model computes the cluster score based at least in part on an affinity of the user for content associated with the targeting criteria and wherein the cluster score is numeric;
      obtaining, for each of the plurality of pre-defined cluster groups, a cluster cutoff score associated with each of the plurality of pre-defined cluster groups;
      identifying a set of cluster groups of the plurality of pre-defined cluster groups in which to include the user based at least in part on the cluster scores for the plurality of pre-defined cluster groups and the determined cluster cutoff scores for the plurality of pre-defined cluster groups; and
      including the user in the identified set of cluster groups; and
   responsive to including the user in the set of cluster groups, including the advertisement request in a selection process with one or more additional advertisement requests to select content for presentation to the user.

2. The method of claim 1, further comprising:
   transmitting content from the advertisement request to a client device for presentation to the user if the advertisement request is selected by the selection process.

3. The method of claim 1, wherein obtaining a cluster cutoff score associated with a cluster group comprises:
   identifying an estimated distribution of cluster scores for the cluster group;
   receiving a target number of users having cluster scores less than the cluster cutoff score; and
   determining the cluster score based at least in part on the estimated distribution of cluster scores and the target number of users having cluster scores less than the cluster cutoff score.

4. The method of claim 3, wherein obtaining the cluster cutoff score associated with the cluster group comprises:
   determining sampling scores for each user from a set of users, the sampling scores determined from the cluster model based at least in part on characteristics of users in the set of users;
   ranking users in the set of users based at least in part on the sampling scores; and
   performing a data fit between the sampling scores and the ranking based at least in part on the sampled scores to determine the estimated distribution of cluster scores for the cluster group; and
   determining the cluster cutoff score based at least in part on the estimated distribution of cluster scores and the target number of users having cluster scores less than the cluster cutoff score.

5. The method of claim 3, wherein obtaining the cluster cutoff score associated with the cluster group comprises:
   determining, by a plurality of computational nodes, estimated cluster cutoff scores based at least in part on a plurality of estimated distributions of cluster scores determined by the plurality of computational nodes;
   comparing the estimated cluster cutoff scores determined by the plurality of computational nodes to determine whether consensus has been reached among the plurality of computational nodes; and
   responsive to determining that consensus has been reached among the plurality of computational nodes, determining the cluster cutoff score based on the estimated cluster cutoff scores.

6. The method of claim 4, wherein obtaining the cluster cutoff score associated with the cluster group further comprises:
   determining a ranking of the determined cluster score within the estimated distribution; and
   updating the data fit based on the determined cluster score and the determined ranking of the determined cluster score within the estimated distribution.

7. The method of claim 1, wherein the cluster model includes a set of cluster model parameters determined by training a machine learning algorithm based on characteristics of users having characteristics satisfying the targeting criteria associated with each of the plurality of pre-defined cluster groups.

8. The method of claim 7, wherein determining, by the processor, a cluster score for a cluster group by applying the set of cluster model parameters to the user characteristics of the user comprises:
 determining the cluster score for the cluster group if the user characteristics of the user do not satisfy at least a threshold number of the targeting criteria.

9. The method of claim 1, wherein an additional advertisement request specifies targeting criteria satisfied by the user characteristics.

10. The method of claim 1, wherein determining whether to include the user in a cluster group based at least in part on the cluster score for the cluster group and the cluster cutoff score for the cluster group comprises:
 comparing the cluster score to the cluster cutoff score; and
 responsive to the cluster score equaling or exceeding the cutoff score, including the user in the cluster group.

11. A computer program product comprising a non-transitory computer-readable storage medium having instructions encoded thereon that, when executed by a processor, cause the processor to:
 receive a request to present an advertisement to a user of a social networking system;
 retrieve an advertisement request associated with targeting criteria from the social networking system;
 retrieve user characteristics of the user maintained by the social networking system;
 determine whether the user characteristics of the user satisfy targeting criteria associated with the advertisement;
 responsive to determining the user characteristics do not satisfy the targeting criteria associated with the advertisement, and after receiving the request to present an advertisement to the user, determine whether to include the user within each of a plurality of pre-defined cluster groups that are each associated with the targeting criteria by:
  determining, for each of the plurality of pre-defined cluster groups, a cluster score based at least in part on a cluster model and additional characteristics of the user, wherein the cluster model computes the cluster score based at least in part on an affinity of the user for content associated with the targeting criteria and wherein the cluster score is numeric;
  obtaining, for each of the plurality of pre-defined cluster groups, a cluster cutoff score associated with each of the plurality of pre-defined cluster groups;
  identifying a set of cluster groups of the plurality of pre-defined cluster groups in which to include the user based at least in part on the cluster scores for the plurality of pre-defined cluster groups and the determined cluster cutoff scores for the plurality of pre-defined cluster groups; and
  including the user in the identified set of cluster groups; and
 responsive to including the user in the set of cluster groups, include the advertisement request in a selection process with one or more additional advertisement requests to select content for presentation to the user.

12. The computer program product of claim 11, wherein obtaining a cluster cutoff score associated with a cluster group comprises:
 identifying an estimated distribution of cluster scores for the cluster group;
 receiving a target number of users having cluster scores less than the cluster cutoff score; and
 determining the cluster score based at least in part on the estimated distribution of cluster scores and the target number of users having cluster scores less than the cluster cutoff score.

13. The computer program product of claim 11, wherein determining whether to include the user within a cluster group based at least in part on a cluster score for the cluster group and a cluster cutoff score for the cluster group comprises:
 comparing the cluster score to the cluster cutoff score; and
 responsive to the cluster score equaling or exceeding the cutoff score, including the user in the cluster group.

14. The method of claim 1, wherein a cluster cutoff score associated with a cluster group is selected by an advertiser associated with the advertisement request.

15. The method of claim 1, wherein a cluster score for a cluster group represents a likelihood that the user will interact with content that is both 1) associated with the targeting criteria, and 2) associated with the cluster group.

16. The method of claim 1, wherein determining a cluster score for a cluster group comprises applying a machine learning algorithm to the user characteristics of the user.

17. The method of claim 16, where the machine learning algorithm applies weights to values representative of each of the user characteristics and linearly combines the weighted values to produce the cluster score.

18. A system comprising a hardware processor and a non-transitory computer-readable storage medium having instructions encoded thereon that, when executed by the hardware processor, cause the hardware processor to:
 receive a request to present an advertisement to a user of a social networking system;
 retrieve an advertisement request associated with targeting criteria from the social networking system;
 retrieve user characteristics of the user maintained by the social networking system;
 determine whether the user characteristics of the user satisfy targeting criteria associated with the advertisement;
 responsive to determining the user characteristics do not satisfy the targeting criteria associated with the advertisement, and after receiving the request to present an advertisement to the user, determine whether to include the user within each of a plurality of pre-defined cluster groups that are each associated with the targeting criteria by:
  determining, for each of the plurality of pre-defined cluster groups, a cluster score based at least in part on a cluster model and additional characteristics of the user, wherein the cluster model computes the cluster score based at least in part on an affinity of the user for content associated with the targeting criteria and wherein the cluster score is numeric;
  obtaining, for each of the plurality of pre-defined cluster groups, a cluster cutoff score associated with each of the plurality of pre-defined cluster groups;
  identifying a set of cluster groups of the plurality of pre-defined cluster groups in which to include the user based at least in part on the cluster scores for the plurality of pre-defined cluster groups and the determined cluster cutoff scores for the plurality of predefined cluster groups; and including the user in the identified set of cluster groups; and responsive to including the user in the set of cluster groups, include the advertisement request in a selection process with one or more additional advertisement requests to select content for presentation to the user.

19. The system of claim 18, wherein obtaining a cluster cutoff score associated with a cluster group comprises:

identifying an estimated distribution of cluster scores for the cluster group;

receiving a target number of users having cluster scores less than the cluster cutoff score; and determining the cluster score based at least in part on the estimated distribution of cluster scores and the target number of users having cluster scores less than the cluster cutoff score.

20. The system of claim 18, wherein determining whether to include the user within a cluster group based at least in part on a cluster score for the cluster group and a cluster cutoff score for the cluster group comprises:

comparing the cluster score to the cluster cutoff score; and responsive to the cluster score equaling or exceeding the cutoff score, including the user in the cluster group.

21. The system of claim 18, wherein a cluster cutoff score associated with a cluster group is selected by an advertiser associated with the advertisement request.

22. The system of claim 18, wherein a cluster score for a cluster group represents a likelihood that the user will interact with content that is both 1) associated with the targeting criteria, and 2) associated with the cluster group.

23. The system of claim 18, wherein determining a cluster score for a cluster group comprises applying a machine learning algorithm to the user characteristics of the user.

24. The system of claim 23, where the machine learning algorithm applies weights to values representative of each of the user characteristics and linearly combines the weighted values to produce the cluster score.

* * * * *